United States Patent Office 3,256,288
Patented June 14, 1966

3,256,288
1-SUBSTITUTED AMINOALKYL-2-ARYLOXY-
METHYLBENZIMIDAZOLE COMPOUNDS
Clarence L. Moyle, Clare, and Diomed M. Chern, Midland, Mich., assignors to The Dow Chemical Company, Midland, Mich., a corporation of Delaware
No Drawing. Filed May 24, 1962, Ser. No. 197,285
9 Claims. (Cl. 260—294.7)

This invention is directed to benzimidazole compounds, particularly (a) N-substituted benzimidazole compounds having the formula

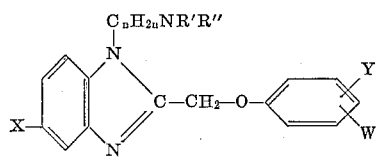

and (b) mineral acid salts of these compounds. In this and succeeding formulas —NR'R" is di(lower-alkyl)amino, piperidino, morpholino or pyrrolidino; X is —H, —NO$_2$, —R, —Cl, —Br or —SONH$_2$; Y is —H, —Br, —Cl, —OH, —OR, —R, —CONH$_2$, —COOH, —COOR, —COOM, —COONH$_4$ or —COOB; W is —H, —CH$_3$ or —Cl; $n$ is an integer of from 2 to 3, inclusive; and wherein R is lower alkyl containing from 1 to 4 carbon atoms, inclusive, M is alkali metal and —COOB represents an amine salt group where the salt forming base is selected from lower alkylamines and lower alkanolamines.

The expression "lower" as above employed indicates a carbon content of from 1 to 4, inclusive. By "alkali metal" is meant sodium, potassium and lithium. By "lower alkylamines" and "lower alkanolamines" are meant amine bases which have one or more lower alkyl or lower hydroxyalkyl radicals on the basic nitrogen and in which lower designates from 1 to 4 carbon atoms. Typical amine bases, A, which form with —COOH, the amine salt group, —COOB and which may also be designated —COOH·A, include methylamine, ethylamine, ethanolamine, isopropanolamine, methylaminoethanol, ethylaminoethanol, diethanolamine, isopropylamine, n-propylamine, n-butylamine, trimethylamine, diisopropylamine, N-methyl-isopropylamine, N-methyl-sec.-butylamine, 2-aminopropyl alcohol, isopropylaminoethanol, n-butylaminoethanol, bis(2-hydroxypropyl)amine, triethylamine, tri(n-butyl)amine, triisopropanolamine, triethanolamine, dimethylaminoethanol, diethylaminoethanol, dibutylaminoethanol, ethyldiethanolamine, dimethylamine, diethylamine and triisopropylamine.

The N-substituted benzimidazole compounds of the present invention have numerous pesticidal applications, both aquatic and terrestrial, and as such are adapted to be employed in agriculture, forestry and horticulture as well as in removal of pests from recreational areas. The compounds further have morphine-like action and are thus useful for exploring selected biological mechanisms in laboratory animals such as making comparative studies of drug response against writhing in mice for evaluating analgetic activity.

The products of the present invention may be prepared by mixing together and causing to react an appropriately substituted o-phenylenediamine having the formula

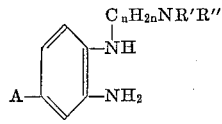

wherein in this and succeeding formulas, A is —H, —R, —Cl, —Br or —SONH$_2$, with an appropriate imino ether hydrochloride having the formula

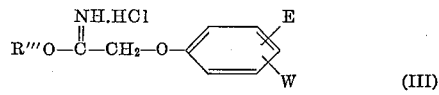

wherein in this and succeeding formulas, E is —H, —R, —Cl, —Br, —OH, —OR or —CONH$_2$ and R''' is a lower alkyl group, to produce the desired benzimidazole product and R'''OH, NH$_3$ and HCl by-products. The gaseous NH$_3$ and HCl generally evolve from the reaction mixture although some of the HCl may react with NH$_3$ and remain in the reaction mixture as ammonium chloride salt or may react with the basic benzimidazole product and remain as the hydrochloride salt thereof.

In carrying out the preparation, substantially equimolar proportions of the reactants are employed although either reactant may be employed in excess. The reaction is generally carried out at a temperature in the range of from 60° to 82° C. for a period of from about 20 to 72 hours. It is preferred that an alcoholic solvent be employed in this process. Suitable solvents include methanol, ethanol and isopropyl alcohol, and is conveniently R'''OH wherein R''' corresponds to the alcoholic component of the reactant imino ether. After completion of the reaction, the mixture is diluted with water with or without the addition of dilute alkali to precipitate the desired benzimidazole product as a white or light colored solid. The latter may be recovered by filtration and purified, if desired, by conventional procedures. Alternatively, the product may be converted to the hydrochloride salt and recovered as the salt or purified via the hydrochloride salt.

In preparing the hydrochloride salt, the product obtained as above described is dissolved in a suitable inert solvent such as diethyl ether and dry hydrogen chloride gas bubbled into the solution to precipitate the desired benzimidazole hydrochloride compound.

In an alternative method suitable for preparing most of the compounds of the present invention, a substituted o-phenylenediamine having the Formula II above is heated together with an appropriate phenoxyacetic acid having the formula

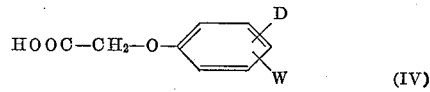

wherein D is —H, —R, —Cl, —Br, —OH or —COOH, in a mineral acid solution.

In carrying out the reaction according to this method, substantially equimolar proportions of the reactants are mixed together with dilute acid, preferably hydrochloric acid, and the resulting mixture heated in the temperature range of from about 100° to 180° C., conveniently at reflux temperature, for a period of from about 12 to 36 hours to obtain the desired benzimidazole produce as its hydrochloride salt. The benzimidazole hydrochloride salt thus obtained may be mixed with dilute aqueous alkali or ammonia to obtain the benzimidazole product as an oil which solidifies on standing. Both the benzimidazole product and the hydrochloride salt may be purified according to methods of the art.

A third method of synthesis is especially adapted for the preparation of benzimidazoles having a 5-nitro substituent

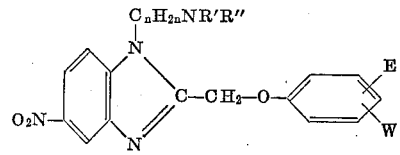

In this procedure which is a modification of the first process hereinbefore described, the —NR′R″ is introduced into the molecule after the formation of the benzimidazole nucleus. This modified procedure is preferred for the preparation of the particular benzimidazole compounds in which the particular o-phenylenediamine is difficulty available as 4-nitro-o-phenylenediamine. In this procedure, the following sequence of reactions is employed:

(1) A 4-nitro-o-phenylenediamine having an N-hydroxyalkyl substituent (VI) is reacted with an appropriate imino ether (III) according to the procedure described previously to obtain an intermediate benzimidazole (VII).

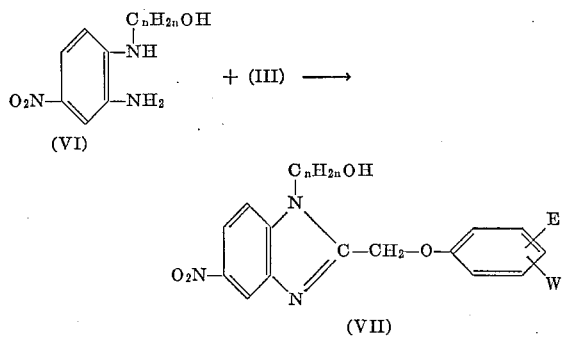

(2) Intermediate (VII) is reacted with thionyl chloride to produce an N-chloroalkyl-substituted benzimidazole (VIII).

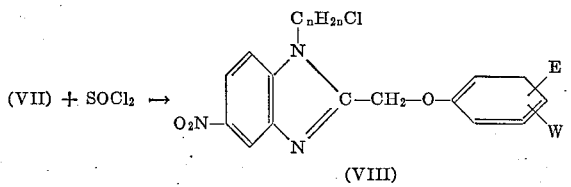

(3) Intermediate (VIII) may be reacted with potassium iodide to produce an iodoalkyl-substituted benzimidazole (IX).

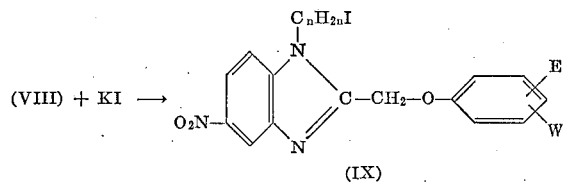

(4) Intermediate (VIII) or (IX) is reacted with dialkylamine to produce the desired N-substituted benzimidazole (V).

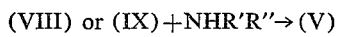

In carrying out the first step of the reaction according to the above equation, substantially equimolar proportions of an appropriate N-hydroxyalkyl-4-nitro-o-phenylenediamine (VI) and an appropriate imino ether hydrochloride (III) are mixed together in an alcoholic solvent and heated at reflux temperature as has been more fully set forth in the first procedure previously described, to obtain intermediate benzimidazole (VII).

Benzimidazole (VII) and anhydrous pyridine are then dissolved in anhydrous benzene and to the resulting mixture is added portionwise, with stirring a benzene solution of thionyl chloride. Substantially equimolar proportions of benzimidazole (VII), pyridine and thionyl chloride are employed although the latter two reagents may be employed in slight excess. The resulting mixture is heated while stirring at reflux temperature for a period of from 12 to 24 hours. At the end of this period, the unreacted thionyl chloride and the solvent are removed by vaporization to obtain an intermediate (VIII) as residue. Intermediate (VIII) may be purified by conventional procedures.

In carrying out the optional step of preparing the iodo-substituted compound, intermediate (VIII) and a substantially equimolar proportion or slight excess of potassium iodide are mixed together in an inert solvent and the resulting mixture heated at reflux temperature for a period of from about 8 to 24 hours. Suitable solvents for carrying out this step include methyl ethyl ketone and acetone. During the heating period a reaction takes place with the formation of intermediate (IX) and potassium chloride by-product. At the end of the heating period the reaction mixture is allowed to cool whereupon the by-product potassium chloride precipitates as a solid. The latter is removed by filtration, and the filtrate heated to vaporize a portion of the solvent and the remainder diluted with water to obtain intermediate (IX) as a solid precipitate. The latter is recovered by filtration.

In carrying out the final step of the synthesis, intermediate (VIII) or (IX) is mixed with a substantially equimolar proportion of amine, R′R″NH, in anhydrous benzene and the resulting mixture heated at 100° C. at autonomous pressure to obtain the benzimidazole product as the hydrochloride or hydroiodide salt which may be recovered as residue by vaporizing off the solvent. The residue is warmed with dilute hydrochloric acid and filtered to remove unreacted starting amine as hydrochloride and the filtrate made alkaline with concentrated alkali to precipitate the desired benzimidazole product (V). The latter may be purified by conventional procedures.

The mineral acid salts of the benzimidazole compounds may be prepared by reacting an appropriate compound with substantially equimolar proportions or small excess of an appropriate mineral acid. Water is a suitable reaction medium. In the preparation of a hydrochloride salt, the procedure of passing dry hydrogen chloride gas through a dry ether solution of the benzimidazole as previously described is considered preferable.

The benzimidazole compounds which are esters, i.e., compounds wherein Y in Formula (I) is —COOR, may be prepared by reacting the acid chloride derived from the appropriate carboxy substituted benzimidazole (i.e., compounds wherein Y in Formula I is —COOH and prepared as above described) with the appropriate alcohol, ROH, or its sodium salt, RONa. The exact amounts of the reactants are not critical, some product being obtained in any case; usually, it is convenient to employ free alcohol and in an excess, the excess alcohol functioning as a solvent or reaction medium. The reaction may be carried out at from room temperature to the boiling point of the alcohol or auxiliary inert solvent, if present, for a period of from several minutes to several hours. Conveniently, the acid chloride is prepared as the first step in the reaction by reacting thionyl chloride with the carboxy substituted benzimidazole compound in an inert solvent and thereafter reacting the acid chloride containing reaction medium with excess of the appropriate alcohol, ROH.

In a preferred method for carrying out the reaction, thionyl chloride is added dropwise to a solution of the appropriate carboxy substituted benzimidazole in an inert solvent. Suitable solvents include chloroform and dimethylformamide. The reaction mixture is allowed to stand for several hours at ambient temperature to obtain the intermediate acid chloride. At the end of this period, an excess of the appropriate alcohol is added and the resulting mixture maintained in the temperature range of from about 15° to about 100° C. whereupon a reaction takes place to obtain the desired ester product. The product may be recovered from the reaction mixture by washing the reaction mixture with water, extracting the product with ether or other inert, water-immiscible solvent and thereafter vaporizing off the solvent.

The benzimidazole compounds which are salts, i.e., compounds wherein Y in Formula I is —COOM, —COONH$_4$ or —COOB, may be prepared by mixing and warming together, usually in aqueous medium, the appropriate carboxy-substituted benzimidazole (i.e., compounds wherein Y in Formula I is —COOH and prepared as previously described) with an appropriate base (i.e., alkali metal hydroxide, ammonium hydroxide, alkylamine or alkanolamine) and thereafter vaporizing off the water to recover the desired salt. Substantially equimolar proportions of the reactants are employed and the reaction may be carried out at room temperature or on a steam bath. If desired, the salt may be purified by conventional procedures.

The following examples illustrate the invention but are not to be construed as limiting.

*Example 1.—1-(2-diethylaminoethyl) - 2 - (4-ethoxyphenoxymethyl)-5-methylbenzimidazole and its hydrochloride*

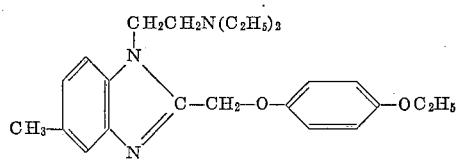

11.0 grams (0.05 mole) of N¹-(2-diethylaminoethyl)-4-methyl-o-phenylenediamine, 13.0 grams (0.05 mole) of ethyl 4-ethoxyphenoxyacetimidate hydrochloride and 50 milliliters of absolute ethanol were mixed together and heated at reflux temperature for 18 hours. During the heating ammonia was evolved from the reaction mixture. After completion of the heating, the reaction mixture was diluted with water whereupon a 1-(2-diethylaminoethyl)-2-(4-ethoxyphenoxymethyl)-5-benzimidazole product precipitated in the reaction mixture as a light colored solid. The latter was recovered by filtration and dried. The product has a molecular weight of 381.

The crude product thus obtained was dissolved in dry diethyl ether and the ether solution treated with activated charcoal to remove impurities. After purification, dry hydrogen chloride was bubbled through an ether solution of the product to produce its hydrochloride salt. The 1 - (2-diethylaminoethyl)-2-(4-ethoxyphenoxymethyl)-5-methylbenzimidazole hydrochloride product was a white crystalline solid melting from 130° to 133° C.

*Example 2.—2-(2-carbamylphenoxymethyl)-1-(2-diethylaminoethyl)benzimidazole*

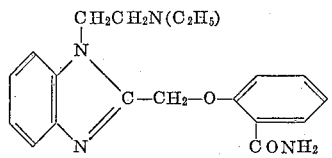

In a manner similar to that described in Example 1, 10.5 grams (0.05 mole) of N-(2-diethylaminoethyl)-o-phenylenediamine, 13.0 grams (0.05 mole) of ethyl 2-carbamylphenoxyacetimidate hydrochloride and 150 milliliters of absolute ethanol were mixed together and heated at reflux temperature for 24 hours. After completion of the heating, the reaction mixture was diluted with aqueous alkali to precipitate a 2-(2-carbamylphenoxymethyl)-1-(2-diethylaminomethyl)benzimidazole product as a white solid melting at 117°–119° C.

*Example 3*

In a manner similar to that above described, the following compounds were prepared:

2-(2-carbamylphenoxymethyl) - 1 - (2 - diethylaminoethyl)-5-methylbenzimidazole melting at 112°–115° C. by the reaction of N¹ - (2-diethylaminoethyl)-4-methyl-o-phenylenediamine and ethyl 2-carbamylphenoxyacetimidate hydrochloride.

1 - (2 - diethylaminoethyl) - 2-(4-ethoxyphenoxymethyl)benzimidazole hydrochloride melting from 198°–202° C. with decomposition by the reaction of ethyl 4-ethoxyphenoxyacetimidate hydrochloride and N - (2-di-ethylaminoethyl)-o-phenylenediamine to produce 1-(2-dimethylaminoethyl) - 2 - (4 - ethoxyphenoxymethyl)benzimidazole followed by the reaction of the latter with hydrogen chloride.

2 - (4 - ethoxyphenoxymethyl) - 1 - (2-piperidinoethyl) benzimidazole hydrochloride melting from 199° to 201° C. by the reaction of ethyl 4-ethoxyphenoxyacetimidate hydrochloride and N - (2-piperidinoethyl)-o-phenylenediamine to produce 2 - (4 - ethoxyphenoxymethyl)-1-(2-piperidinoethyl)benzimidazole followed by the reaction of the latter with hydrogn chloride.

2 - (4 - ethoxyphenoxymethyl)-1-(2-morpholinoethyl) benzimidazole hydrochloride melting from 238° to 240° C. by the reaction of ethyl 4-ethoxyphenoxyacetimidate hyrochloride and N - (2-morpholinoethyl)-o-phenylenediamine to produce 2 - (4 - ethoxyphenoxymethyl)-1-(2-morpholinoethyl)benzimidazole followed by the reaction of the latter with hydrogen chloride.

1 - (2 - diethylaminoethyl) - 2 - (4-ethoxyphenoxymethyl) - 5 - chlorobenzimidazole hydrochloride melting from 182° to 185° C. by the reaction of ethyl 4-ethoxyphenoxyacetimidate hydrochloride and 4-chloro-N¹-(2-diethylaminoethyl)-o-phenylenediamine to produce 1-(2-diethylaminoethyl) - 2 - (4 - ethoxyphenoxymethyl) - 5-chlorobenzimidazole followed by the reaction of the latter with hydrogen chloride.

*Example 4.—1 - (2 - diethylaminoethyl)-2-(4-ethoxyphenoxymethyl)benzimidazole and its hydrochloride*

10 grams (0.051 mole) of 4-ethoxyphenoxyacetic acid, 10 grams (0.049 mole) N-(2-diethylaminoethyl)-o-phenylenediamine and 200 milliliters of 4 normal (4 N) hydrochloric acid were mixed together and heated at reflux temperature for 24 hours. At the end of this period, the reaction mixture was filtered while hot to remove impurities and side products and the filtrate allowed to cool to obtain a white crystalline solid. The latter was mixed with 5 percent aqueous sodium hydroxide solution to precipitate as an oil, a 1-(2-diethylaminoethyl)-2-(4-ethoxyphenoxymethyl)benzimidazole product which on standing solidified. The molecular weight of the product is 367.5.

The 1 - (2 - diethylaminoethyl)-2-(4-ethoxyphenoxymethyl)benzimidazole thus obtained dissolved in 95 percent ethyl alcohol, the alcohol solution treated with activated charcoal, thereafter diluted with an equal volume of ether and the resulting mixture added slowly and with stirring to a cold hydrogen chloride saturated ether solution to obtain as a fine white powder, a 1-(2-diethylaminoethyl)-2-(4-ethoxyphenoxymethyl)benzimidazole hydrochloride product as a hydrate and melting at 170°–171° C.

*Example 5*

In preparation carried out in a manner similar to that described in Example 4 the following benzimidazole hydrochloride salts were prepared:

2 - (4 - chlorophenoxymethyl) - 1 - (2-diethylaminoethyl)benzimidazole hydrochloride melting at 219°–221° C. by the reaction of 4-chlorophenoxyacetic acid and N-(2-diethylaminoethyl)-o-phenylenediamine to produce 2 - (4 - chlorophenoxymethyl)-1-(2-diethylaminoethyl) benzimidazole, followed by the reaction of the latter with hydrogen chloride.

1 - (2 - diethylaminoethyl) - 2 - (4-normal-propoxyphenoxymethyl)benzimidazole hydrochloride melting at 73.7°–74° C. by the reaction of 4-normal-propoxyphenoxyacetic acid and N-(2-diethylaminoethyl)-o-phenylenediamine to produce 1 - (2 - diethylaminoethyl)-2-(4-normal-propoxyphenoxymethyl)benzimidazole followed by the reaction of the latter with hydrogen chloride.

1 - (2 - diethylaminoethyl) - 2-phenoxymethylbenzimidazole hydrate melting at 201°–203° C. by the reaction of phenoxyacetic acid and N-(2-diethylaminoethyl)-o-phenylenediamine to produce 1-(2- diethylaminoethyl)-2 - phenoxymethylbenzimidazole followed by the reaction of the latter with hydrogen chloride.

1 - (2 - diethylaminoethyl) - 2(p-toloxymethyl)benzimidazole hydrochloride melting at 206°–208° C. by the reaction of p-toloxyacetic acid and N-(2-diethylaminoethyl)-o-phenylenediamine to produce 1-(2-diethylaminoethyl)-2-(p-toloxymethyl)benzimidazole followed by the reaction of the latter with hydrogen chloride.

1 - (2 - diethylaminoethyl) - 2-(3,5-xylyloxymethyl) benzimidazole hydrochloride melting from 213° to 216° C. with decomposition by the reaction of 3,5-xylyloxyacetic acid and N-(2-diethylaminoethyl)-o-phenylenediamine to produce 1 - (2 - diethylaminoethyl)-2-(3,5-xylyloxymethyl)benzimidazole followed by the reaction of the latter with hydrogen chloride.

1 - (2 - diethylaminoethyl) - 2 - (2,6-xylyloxymethyl) benzimidazole hydrochloride having a melting point of 231°–232° C. by the reaction of 2,6-xylyloxyacetic acid and N - (2 - diethylaminoethyl)-o-phenylenediamine to produce 1 - (2 - diethylaminoethyl) - 2-(2,6-xylyloxymethyl)benzimidazole followed by the reaction of the latter with hydrogen chloride.

1 - (2 - diethylaminoethyl) - 2 - (4-methoxyphenoxymethyl)benzimidazole hydrochloride melting from 163° to 166° C. by the reaction of 4-methoxyphenoxyacetic acid and N - (2-diethylaminoethyl)-o-phenylenediamine to produce 1 - (2 - diethylaminoethyl)-2-(4-methoxyphenoxymethyl)benzimidazole followed by the reaction of the latter with hydrogen chloride.

*Example 6.—1-(2-diethylaminoethyl)-2-(3,5-xylyloxymethyl)-5-sulfamylbenzimidazole*

In a similar manner, 12.5 grams (0.04 mole) of N¹-(2-diethylaminoethyl)-4-sulfamyl - o - phenylenediamine, 12.5 grams (0.4 mole) of 3,5-xylyloxyacetic acid and 40 milliliters of 4 N hydrochloric acid were mixed together and heated at reflux temperature for 24 hours. After completion of the heating, the reaction mixture was diluted with aqueous alkali to precipitate a 1-(2-diethylaminoethyl)-2-(3,5-xylyloxymethyl)-5-sulfamylbenzimidazole product melting at 181° to 183° C.

*Example 7*

In similar preparations, the following benzimidazoles were prepared:

1-(2-diethylaminoethyl)-2-(4 - ethoxyphenoxymethyl)-5-sulfamylbenzimidazole having a melting point of 175°–179° C. by the reaction of N¹-(2-dimethylaminoethyl)-4-sulfamyl-o-phenylenediamine and ethyl 4-ethoxyphenoxyacetic acid.

1-(2-diethylaminoethyl)-2-(2-methoxy - 4 - methylphenoxymethyl)benzimidazole melting from 61° to 64° C. by the reaction of N-(2-diethylaminoethyl)-o-phenylenediamine and 2-methoxy-4-methylphenoxyacetic acid.

1-(2-diethylaminoethyl)-2-(2 - ethoxyphenoxymethyl) benzimidazole having a melting point of 64°–65° C. by the reaction of N-(2-diethylaminoethyl)-o-phenylenediamine and 2-ethoxyphenoxyacetic acid.

1-(2-diethylaminoethyl)-2-(4 - hydroxyphenoxymethyl) benzimidazole having a melting point of 147° C. by the reaction of N-(2-diethylaminoethyl)-o-phenylenediamine and 4-methoxyphenoxyacetic acid.

1-(2-diethylaminoethyl)-2 - (3 - hydroxyphenoxymethyl)benzimidazole melting at 231°–231.5° C. with decomposition by the reaction of N-(2-diethylaminoethyl)-o-phenylenediamine and 3-hydroxyphenoxyacetic acid.

*Example 8.—1-(2-diethylaminoethyl)-2 - (4 - ethoxyphenoxymethyl)-5-nitrobenzimidazole and its hydrochloride*

40.0 grams (0.22 mole of 1-(2-hydroxyethylamino)-2-amino-4-nitrobenzene, 53 grams (0.22 mole) of ethyl 4-ethoxyphenoxyacetimidate hydrochloride and 800 milliliters of absolute ethanol were mixed together and heated at reflux temperature for 48 hours. During the heating period a reaction took place with the formation of a gray solid. The latter was recovered by filtration, suspended in water, the resulting aqueous mixture made alkaline to a pH of about 10 with 20% aqueous sodium hydroxide solution and heated on a steam bath for about 30 minutes. The solid thus treated was recovered by filtration and purified by treating a dimethylformamide solution thereof with activated charcoal and crystallizing from dimethylformamide-water mixture to obtain a 1-(2-hydroxyethylamino)-2-(4-ethoxyphenoxymethyl)-5-nitrobenzimidazole intermediate as a white crystalline solid melting from 178° to 180° C.

A solution of 20.0 grams (0.168 mole) of thionyl chloride in 100 milliliters of dry benzene was added portionwise over a two hour period with stirring to a mixture of 53.5 grams (0.15 mole) of 1-(2-hydroxyethylamino)-2-(4-ethoxyphenoxymethyl)-5 - nitrobenzimidazole above prepared, 13.0 grams (0.165 mole) of dry pyridine and 1500 milliliters of anhydrous benzene. The resulting mixture was heated at reflux temperature with stirring for 24 hours. After completion of the heating, the by-product sulfur dioxide and benzene were removed by vaporization to obtain a 1-(2-chloroethyl)-2-(4-ethoxyphenoxymethyl)-5-nitrobenzimidazole intermediate as a solid. The latter was purified by successively crystallizing from dimethylformamide, treating an acetone solution thereof with activated charcoal and recrystallizing from acetone-water to obtain the purified intermediate 1-(2-chloroethyl)-2-(4-ethoxyphenoxymethyl) - 5 - nitrobenzimidazole as pale yellow crystals melting from 152° to 155° C.

51 grams (1.35 mole) of 1-(2-chloroethyl)-2-(4-ethoxyphenoxymethyl)-5-nitrobenzimidazole, 100 milliliters of diethylamine and 1 liter of anhydrous benzene were mixed together and heated with agitation in a pressure vessel at 120° C. and 50 pounds per square inch gauge (p.s.i.g.) pressure for a period of 48 hours. At the end of this period, the solvent was removed by vaporization and the residue mixed with 5% hydrochloric acid solution and heated on a steam bath. The resulting hot mixture was filtered to remove unreacted starting material. The filtrate was allowed to cool and then made alkaline with aqueous 20 percent sodium hydroxide whereupon a 1-(2-diethylaminoethyl)-2-(4 - ethoxyphenoxymethyl)-5-nitrobenzimidazole product precipitated. The latter was recovered by filtration, purified by treating an ether solution thereof with activated charcoal and converted to the hydrochloride salt by treating an ether solution with dry hydrogen chloride gas. The 1-(2-diethylaminoethyl)-2-(4-ethoxyphenoxymethyl) - 5 - nitrobenzimidazole hydrochloride was a solid melting from 189° to 192° C.

*Example 9.—1-(2-diethylaminoethyl)-2-(4-ethoxyphenoxymethyl)-5-nitrobenzimidazole*

4.0 grams (0.0106 mole) of 1-(2-chloroethyl)-2-(4-ethoxyphenoxymethyl)-5 - nitrobenzimidazole intermediate prepared as described in Example 8, 2.0 grams of potassium iodide and 100 milliliters of methyl ethyl ketone were mixed together and refluxed for four hours to obtain a 1-(2-iodoethyl)-2-(4-ethoxyphenoxymethyl)-5-nitrobenzimidazole intermediate and potassium chloride by-product. The mixture was cooled and filtered to remove the by-product and the filtrate heated to boiling and diluted with hot water whereupon the intermediate precipitated from the reaction mixture as a crystalline solid. The 1-(2-iodoethyl)-2-(4-ethoxyphenoxymethyl)-5-nitrobenzimidazole intermediate thus obtained melted at 162°–164° C. The intermediate was heated with diethylamine and benzene under pressure in a manner similar to that described in Example 8 to obtain the 1-(2-diethylaminoethyl)-2-(4-ethoxyphenoxymethyl)-5 - nitrobenzimidazole hydrochloride melting at 189°–192° C.

Example 10

In a manner similar to that described in Example 8, the following compounds were prepared:

1 - (2-diethylaminoethyl)-2-(4-ethylphenoxymethyl)-5-nitrobenzimidazole melting at 84°–85° C. by the reaction of 1-(2-hydroxyethylamino)-2-amino-4-nitrobenzene with ethyl 4-ethylphenoxyacetimidate hydrochloride to produce an intermediate 1 - (2-hydroxyethyl)-2-(4-ethylphenoxymethyl)-5-nitrobenzimidazole followed by the reaction of the latter with thionyl chloride to produce an intermediate 1 - (2 - chloroethyl)-2-(4-ethylphenoxymethyl)-5-nitrobenzimidazole followed by the reaction of the latter with diethylamine.

1 - (2 - diethylaminoethyl) - 2 - phenoxymethyl-5-nitrobenzimidazole having a molecular weight of 368.4 by the reaction of 1-(2-hydroxyethylamino)-2-amino-4-nitrobenzene with ethyl phenoxyacetimidate hydrochloride to produce an intermediate 1-(2-hydroxyethyl)-2-phenoxymethyl-5-nitrobenzimidazole followed by the reaction of the latter with thionyl chloride to produce an intermediate 1-(2 - chloroethyl) - 2-phenoxymethyl-5-nitrobenzimidazole followed by the reaction of the latter with diethylamine.

1 - (2 - diethylaminoethyl)-2-phenoxymethyl-5-nitrobenzimidazole hydrochloride melting from 225° to 230° C. by the reaction of 1-(2-diethylaminoethyl)-2-phenoxymethyl-5-nitrobenzimidazole prepared as above described with hydrogen chloride.

1 - (2 - diethylaminopropyl)-2-(4-ethoxyphenoxymethyl)-benzimidazole having a melting point of 86°–87° C. by the reaction of 1-(2-hydroxypropylamino)-2-aminobenzene with ethyl 4-ethoxyphenoxyacetimidate hydrochloride to produce an intermediate 1-(2-hydroxypropyl)-2 - (4-ethoxyphenoxymethyl)benzimidazole followed by the reaction of the latter with thionyl chloride to produce an intermediate 1-(2-chloropropyl)-2-(4-ethoxyphenoxymethyl)benzimidazole followed by the reaction of the latter with diethylamine.

Example 11

In a manner similar to that described in Example 1, the following compounds are prepared:

1 - (2 - dimethylaminoethyl)-2-(5-isopropyl-2-methylphenoxymethyl) - 5-bromobenzimidazole by the reaction of $N^1$-(2-dimethylaminoethyl)-4-bromo-o-phenylenediamine and ethyl isopropyl-2-methylphenoxyacetimidate hydrochloride.

1 - (3 - diethylaminopropyl) - 2-(4-tertiary-butyl)phenoxymethyl-5-sulfamylbenzimidazole by the reaction of $N^1$ - (3 - diethylaminopropyl)-4-sulfamyl-o-phenylenediamine and ethyl 4-(tertiary-butyl)phenoxyacetimidate hydrochloride.

2 - (2 - carbamyl-4-methylphenoxymethyl)-5-chloro-1-(3-pyrrolidinopropyl)benzimidazole by the reaction of $N^1$-(3 - pyrrolidinopropyl)-4-chloro-o-phenylenediamine and ethyl 2-carbamyl-4-methylphenoxyacetimidate hydrochloride.

Example 12.—1-(2-diethylamino)-2-(o-toloxymethyl)benzimidazole phosphoric acid salt 11.2 grams (0.34 mole) of 1-(2-diethylaminoethyl)-2-(o-toloxymethyl)benzimidazole, 4 grams (0.048 mole) of 85% phosphoric acid and 75 milliliters of water were heated together to boiling, the hot mixture filtered to remove insoluble impurities and the filtrate cooled to precipitate a 1-(2-diethylaminoethyl)-2-(o-toloxymethyl)benzimidazole phosphoric acid salt having a molecular weight of 428.

Example 13

In preparations carried out in a manner similar to that described in Example 12, the following compounds are prepared:

1 - (2 - diethylaminoethyl)-2-(o-toloxymethyl)benzimidazole hydrobromide by the reaction of 1-(2-diethylaminoethyl)-2-(o-toloxymethyl)benzimidazole and concentrated hydrobromic acid.

1 - (2 - diethylaminoethyl)-2-(2-methoxy-4-methylphenoxymethyl)benzimidazole phosphoric acid salt by the reaction of 1-(2-diethylaminoethyl)-2-(2-methoxy-4-methylphenoxymethyl)benzimidazole and phosphoric acid.

Example 14

In a manner similar to that described in Example 4, the following compounds are prepared:

5 - ethyl - 2-(2,4-dichlorophenoxymethyl)-1-(2-methylisopropylaminoethyl)benzimidazole by the reaction of $N^1$ - (2-methylisopropylaminoethyl)-4-ethyl-o-phenylenediamine and 2,4-dichlorophenoxyacetic acid.

2 - (4 - carboxyphenoxymethyl)-1-(2-dimethylaminoethyl)-5-isopropylbenzimidazole by the reaction of $N^1$-(2-dimethylaminoethyl)-4-isopropyl-o-phenylenediamine and 4-carboxyphenoxyacetic acid.

2 - (2 - carboxyphenoxymethyl)-1-(2-piperidinoethyl)-benzimidazole by the reaction of N-(2-piperidinoethyl)-o-phenylenediamine and 2-carboxyphenoxyacetic acid.

1 - (3 - ethylisopropylaminopropyl)-2-(2,4-dichlorophenoxymethyl)benzimidazole by the reaction of N-(3-diethylisopropylamino)-o-phenylenediamine and 2,4-dichlorophenoxyacetic acid.

1 - (3-di-(n-butylamino)propyl)-2-(2-methyl-4-chlorophenoxymethyl)benzimidazole by the reaction of N-3-di-(n-butylamino)propyl)-o-phenylenediamine and 2-methyl-4-chlorophenoxyacetic acid.

2 - (3 - carboxyphenoxymethyl)-5-bromo-1-(2-dimethylaminoethyl)benzimidazole by the reaction of $N^1$-(2-dimethylaminoethyl) - 4-bromo-o-phenylenediamine and 3-carboxyphenoxyacetic acid.

Example 15.—2-(2-carbethoxyphenoxymethyl)-1-(2-piperidinoethyl)benzimidazole 2 milliliters of thionyl chloride is added dropwise to a solution of 7.6 grams (0.02 mole) of 2 - (2 - carboxyphenoxymethyl) - 1 - (2 - piperidinoethyl)benzimidazole, prepared as described in Example 14, in 25 milliliters of chloroform and the resulting mixture allowed to stand for several hours. At the end of this period 25 milliliters of anhydrous ethyl alcohol is added and the reaction mixture allowed to stand at room temperature for several hours, then warmed on a steam bath for about 15 minutes, cooled, diluted with water, extracted with diethyl ether and the ether vaporized to obtain as residue a 2-(2-carbethoxyphenoxymethyl) - (2 - piperidinoethyl)benzimidazole product having a molecular weight of 407.

Example 16

In a similar preparation, 2-(2-carbisopropoxyphenoxymethyl) - 1-(2-dimethylaminoethyl)-5-isopropylbenzimidazole having a molecular weight of 423 is prepared by reacting 2-(2-carboxyphenoxymethyl)-1-(2-dimethylaminoethyl)-5-isopropylbenzimidazole with thionyl chloride to produce the intermediate acid chloride, followed by the reaction of the latter with isopropyl alcohol.

Similarly, 2-(3-carbomethoxyphenoxymethyl)-5-bromo-1-(2-dimethylaminoethyl)benzimidazole having a molecular weight of 432 is prepared by the reaction of 2-(3-carboxyphenoxymethyl) - 5 - bromo-1-(2-dimethylaminoethyl)benzimidazole with thionyl chloride to produce the intermediate acid chloride, followed by the reaction of the latter with methyl alcohol.

Example 17

The following alkali metal, ammonium and amine salts of 2-(4-carboxyphenoxymethyl)-1-(2-dimethylaminoethyl)-5-isopropylbenzimidazole, 2-(2-carboxyphenoxymethyl)-1-(2-piperidinoethyl)benzimidazole and 2 - (3 - carboxyphenoxymethyl)-5-bromo-1 - (2 - dimethylaminoethyl)benzimidazole are prepared by mixing and warming together the appropriate acid and base in substantially equimolar proportions, generally, in an aqueous solvent and thereafter, evaporating to dryness: sodium salt of 2-(4-carboxyphenoxymethyl)-1-(2 - dimethylaminoethyl)-5-isopropylbenzimidazole, M.W. 403; dimethylamine salt of 2-(4-carboxyphenoxymethyl)-1-(2-dimethylaminoethyl)-5-isopropylbenzimidazole, M.W. 426; ethanolamine salt of 2-(2-carboxyphenoxymethyl)-1-(2-piperidinoethyl)benzimidazole, M.W. 440; ammonium salt of 2-(2-carboxyphenoxymethyl)-1-(2 - piperidinoethyl)benzimidazole, M.W. 396; isopropanolamine salt of 2-(3-carboxyphenoxymethyl) - 5 - bromo-1-(2-dimethylaminoethyl) benzimidazole, M.W. 493; and potassium salt of 2-(3-carboxyphenoxymethyl)-5-bromo-1-(2 - dimethylaminoethyl)benzimidazole, M.W. 457.

The N-substituted benzimidazole compounds of the present invention find utility as agricultural pesticides. Thus, they may be employed for the control of plant and soil dwelling pests such as root-knot nematodes, soil fungi, plum curculio, etc. In a representative operation for use as nematocide, good controls of larvae of root-knot nematodes are obtained when said larvae are contacted in separate operations with compositions containing 1000 parts by weight of one of 2-(2-diethylaminoethyl)-2-(3,5-xylyloxymethyl)benzimidazole, 1-(2-diethylaminoethyl)-2-(2-carbamylphenoxymethyl)benzimidazole and 1-(2-diethylaminoethyl)-2 - phenoxymethylbenzimidazole hydrochloride per million parts of aqueous dispersion. Aquatic pests may also be controlled by the use of minor amounts of these compounds. For example, it was found that complete controls of lake emerald shiners were obtained when said species was contacted with an aqueous medium containing only one part per million by weight of 1-(2-diethylaminoethyl)-2-(3,5-xylyloxymethyl)benzimidazole hydrochloride.

The compounds may be formulated in germicidal compositions for the control of infectious microorganisms. Illustrative of the antimicrobial properties were the complete controls obtained of *Pseudomonas aeroginosa, Staphylococcus aureus, Salmonella typhosa* and *Aerobacter aerogenes* when in separate operations, nutrient agar media containing one of 1-(2-diethylaminoethyl)-2-phenoxymethylbenzimidazole, 2-(4-ethoxyphenoxymethyl)-1-(2-dimethylaminoethyl)benzimidazole, 2-(4-ethoxyphenoxymethyl)-1-(2 - piperidinoethyl)benzimidazole hydrochloride and 1-(2-diethylaminoethyl) - 2 - (3,5-xylyloxymethyl)benzimidazole at a concentration of 0.5 percent by weight were inoculated with one of the above identified microbial organisms.

The compounds of the present invention also have very interesting pharmacological properties rendering them useful for laboratory studies in exploring drug action. The compounds show gradation of effectiveness in countering drug action with different substituents and position of substituent and provide a useful tool for exploring the mechanism of drug action. Thus, the products have been found to show interesting antagonistic properties against drug-induced writhing in mice characteristic of analgesic agents. For example, a very small amount of 2-(p-ethoxyphenoxymethyl) - 1 - (2-diethylaminoethyl) - 5 - nitrobenzimidazole hydrochloride was found to exert remarkable analgesic effect against writhing in mice when injected subcutaneously to mice which had previously been injected with phenylquinone, a known writhing producing agent. 2-(4-ethoxyphenoxymethyl)-1-(2-piperidinoethyl)-5-nitrobenzimidazole, 1-(2-diethylaminoethyl)-2-(4 - ethoxyphenoxymethyl)benzimidazole hydrochloride, 2-(4-ethoxyphenoxymethyl)-1-(2-diethylaminoethyl)-5-methylbenzimidazole hydrochloride, 1-(2-diethylaminoethyl)-2-(4-ethylphenoxymethyl) - 5 - nitrobenzimidazole and 2 - (4 - ethoxyphenoxymethyl)-1-(2-piperidinoethyl)benzimidazole hydrochloride all showed very good activity in this respect.

Many of the compounds of the present invention exert profound effects on the cardiovascular system and the central nervous system of experimental animals. They may be employed to explore the vascular effects of various hormones and drugs. Thus, 1-(2-diethylaminoethyl)-2-(4 - methoxyphenoxymethyl)benzimidazole hydrochloride selectively prevents the hypertensive effect of 5-hydroxytryptamine upon the blood pressure of dogs. On the other hand, 1-(2-diethylaminoethyl)-2-(2,6-xylyloxymethyl)-5-sulfamylbenzimidazole hydrochloride and 1-(2-diethylaminoethyl) - 2 - (2,6-xylyloxymethyl)benzimidazole hydrochloride are useful tools in comparative laboratory studies in view of the hypertensive activity against 5-hydroxytryptamine and vasopressin induced elevation of blood pressure in the former contrasted to selective 5-hydroxytryptamine induced elevation of blood pressure of the latter and the accentuation of the hypertensive action of nicotine by the former.

The reactants may be prepared by methods well-known to those skilled in the art. Thus, the o-phenylenediamine reactant having the Formula II may be prepared by heating together at reflux temperature an o-chloronitrobenzene having the formula

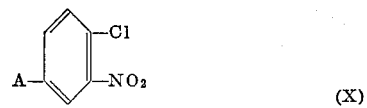

(X)

with an appropriate diamine, $H_2NC_nH_{2n}NR'R''$, to obtain the resulting amino-nitrobenzene having the formula

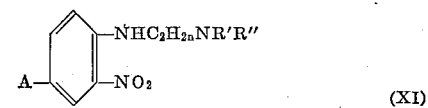

(XI)

followed by the reduction of the latter with hydrogen in the presence of nickel catalyst at a temperature of from about 30° to 35° C. and 500 pounds per square inch pressure.

The nitro-substituted o-phenylenediamine reactant having the Formula VI may be prepared by mixing together and heating at reflux temperature 1-chloro-3,5-dinitrobenzene with an appropriate hydroxyalkylamine, $$H_2NC_nH_{2n}OH$$

to obtain an amino-dinitrobenzene having the formula

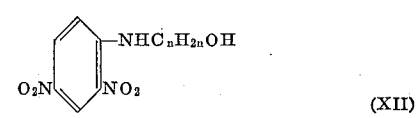

(XII)

followed by mixing the latter with an anhydrous ammonical methanol solution and bubbling hydrogen sulfide gas through the resulting mixture.

The imino ether starting material may be prepared by heating together an appropriately substituted phenol

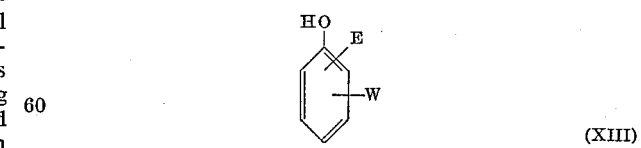

(XIII)

with chloroacetonitrile in the presence of potassium carbonate to obtain an appropriately substituted phenoxyacetonitrile having the formula

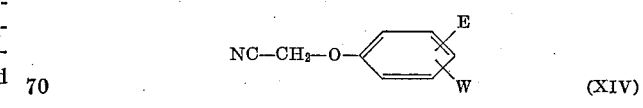

(XIV)

followed by the reaction of the latter with anhydrous lower alkanol, R'''OH, and hydrogen chloride gas at a temperature of about 5° C. to obtain the imino ether having the Formula III.

The reactant phenoxyacetic acid having the Formula IV may be prepared by heating together an appropriate phenol

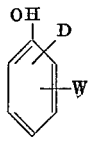

and bromoacetic acid in the presence of aqueous sodium hydroxide, cooling and neutralizing the mixture of pH 6 to precipitate the desired phenoxyacetic acid reactant.

We claim:
1. A benzimidazole compound selected from the group consisting of (a) compounds having the formula

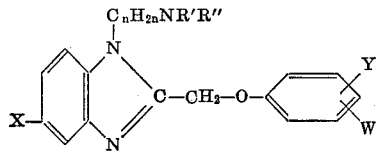

and (b) mineral acid salts of (a), wherein —R'R'' is selected from the group consisting of di(lower-alkyl) amino, piperidino, morpholino and pyrrolidino; X is selected from the group consisting of —H, —$NO_2$, —R, —Cl, —Br and —$SONH_2$; Y is selected from the group consisting of —H, —Br, —Cl, —OH, —OR, —R, —$CONH_2$, —COOH, —COOR, —COOM, —$COONH_4$ and —COOB; W is selected from the group consisting of —H, —$CH_3$ and —Cl; $n$ is an integer of from 2 to 3, inclusive; and wherein R is lower alkyl containing from 1 to 4 carbon atoms, inclusive, M is alkali metal and —COOB represents an amine salt group where the salt forming base is selected from the group consisting of lower alkylamines and lower alkanolamines.

2. 1-(2-diethylaminoethyl)-2-(4 - ethoxyphenoxymethyl)-5-nitrobenzimidazole hydrochloride.
3. 1-(2-diethylaminoethyl)-2-(3,5 - dimethylphenoxymethyl)-5-sulfamylbenzimidazole.
4. 1-(2-diethylaminoethyl) - 2 - (4-methoxyphenoxymethyl)benzimidazole hydrochloride.
5. 1-(2-diethylaminoethyl)-2-(4 - ethoxyphenoxymethyl)-5-sulfamylbenzimidazole.
6. 1-(2-diethylaminoethyl)-2-(4 - ethoxyphenoxymethyl)benzimidazole.
7. 1-(2-diethylaminoethyl)-2 - phenoxymethylbenzimidazole hydrochloride.
8. 1-(2-diethylaminoethyl)-2-(2,6 - dimethylphenoxymethyl)benzimidazole hydrochloride.
9. 2-(4-ethoxyphenoxymethyl) - 5 - nitro-1-(2-piperidinoethyl)benzimidazole.

References Cited by the Examiner

UNITED STATES PATENTS

| | | | |
|---|---|---|---|
| 2,935,514 | 5/1960 | Hoffman et al. | 260—309.2 |
| 3,068,239 | 12/1962 | Miller | 260—309.2 X |
| 3,113,948 | 12/1963 | Zellner | 260—309.2 |

FOREIGN PATENTS 243,766   7/1926   Great Britain.

OTHER REFERENCES

Burger, Medicinal Chemistry, vol. 1, page 191, Interscience, New York, 1951.

WALTER A. MODANCE, *Primary Examiner.*

NICHOLAS S. RIZZO, *Examiner.*

A. D. SPEVACK, *Assistant Examiner.*